C. DUROSSETTE & J. G. WILLIAMS.
FOLDING FURNITURE.
APPLICATION FILED OCT. 14, 1913.
1,114,595.
Patented Oct. 20, 1914.
2 SHEETS—SHEET 2.
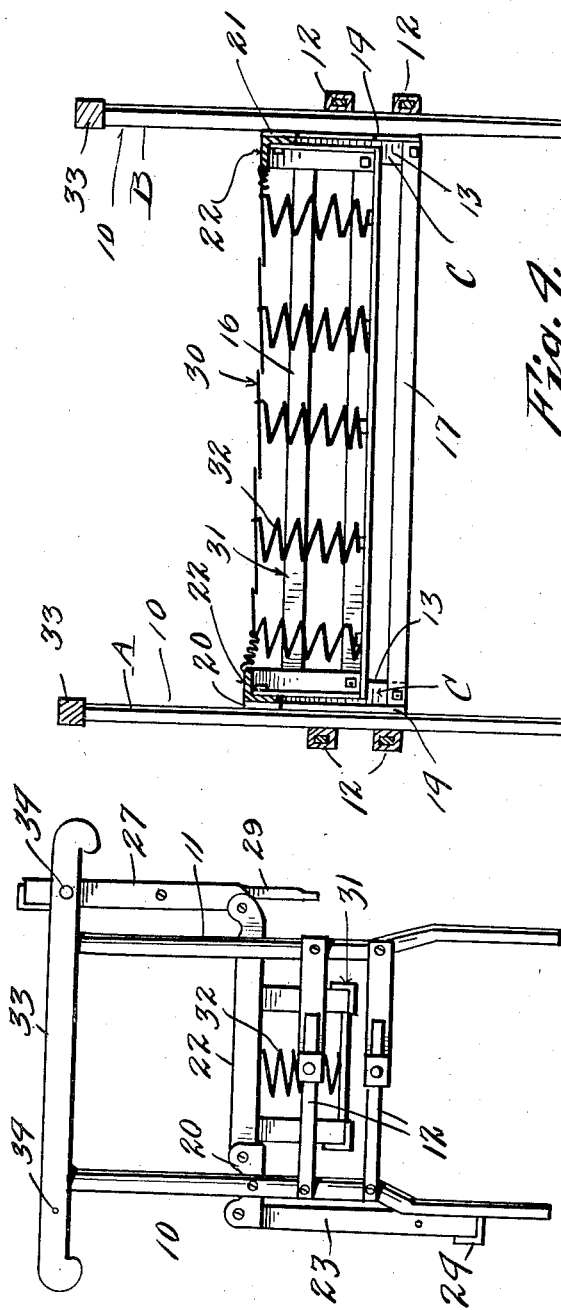
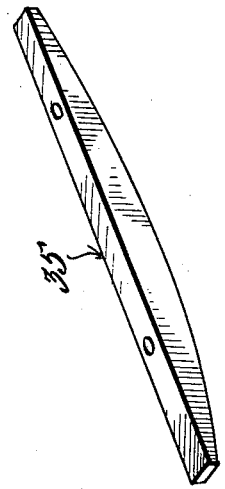
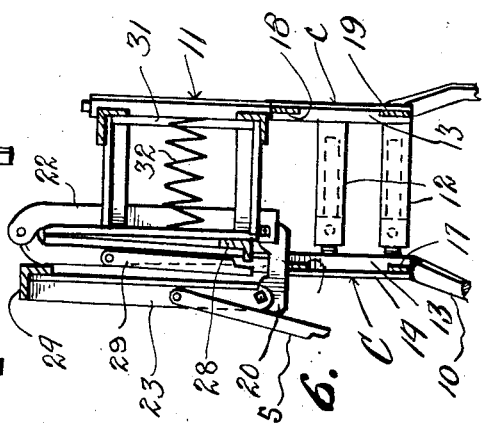
Witnesses
Inventors
C. Durossette.
and J. G. Williams
By Chandler Chandler
Attorneys

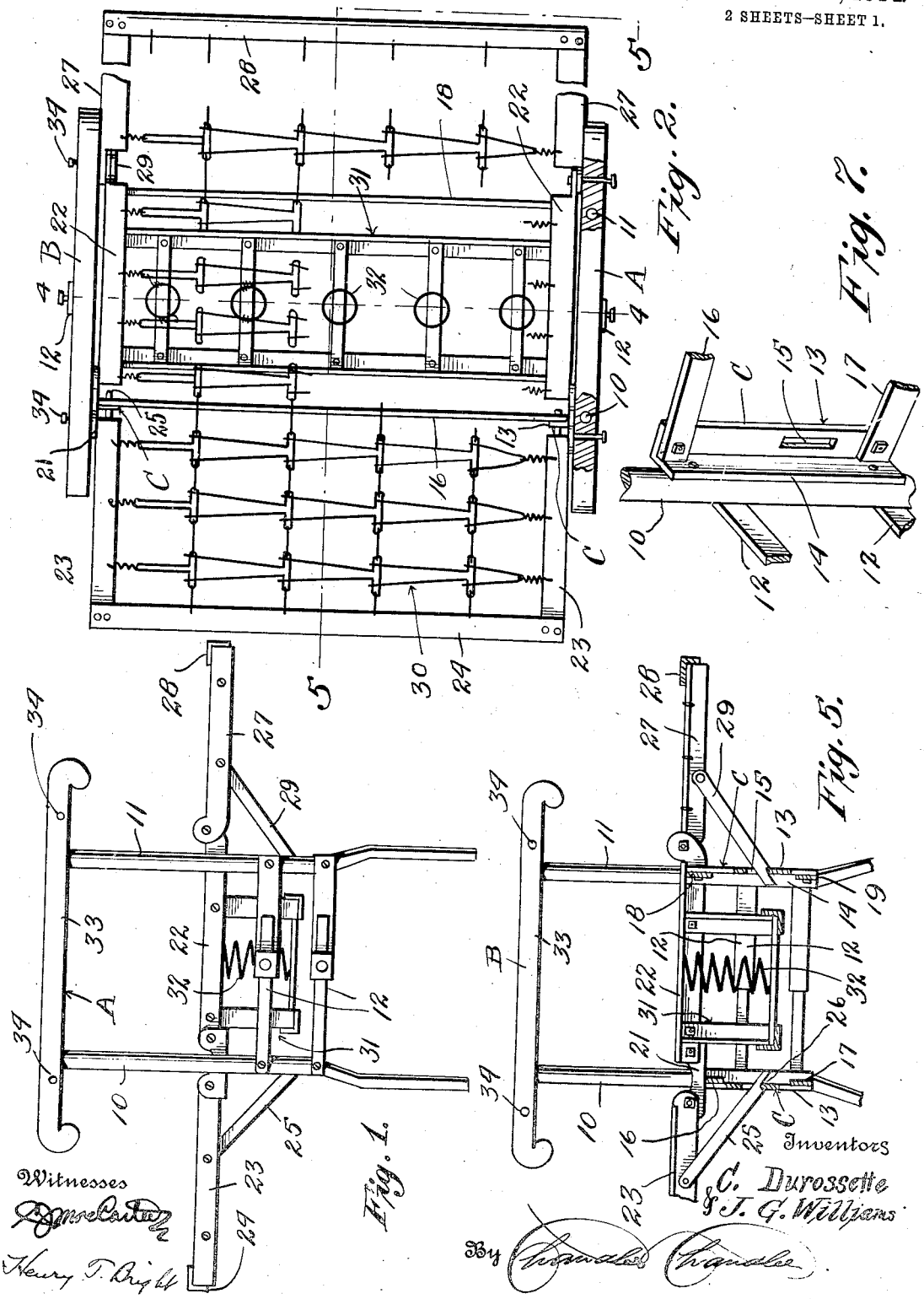

UNITED STATES PATENT OFFICE.

CLYDE DUROSSETTE AND JOHN G. WILLIAMS, OF WALSENBURG, COLORADO.

FOLDING FURNITURE.

1,114,595.  Specification of Letters Patent.  Patented Oct. 20, 1914.

Application filed October 14, 1913. Serial No. 795,115.

*To all whom it may concern:*

Be it known that we, CLYDE DUROSSETTE and JOHN G. WILLIAMS, citizens of the United States, residing at Walsenburg, in the county of Huerfano, State of Colorado, have invented certain new and useful Improvements in Folding Furniture; and we do hereby declare the following to be a full, clear, and exact description of the invention, such as will enable others skilled in the art to which it appertains to make and use the same.

This invention relates to folding furniture.

The object of the invention resides in the provision of an article of furniture which can be folded so as to occupy a relatively small space either in storage or shipment.

A further object of the invention resides in the provision of an article of furniture which can be adjusted so as to serve either as a couch, bed or crib.

With the above and other objects in view the invention consists in the detail of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side view of the invention showing same adjusted so as to serve as a bed; Fig. 2, a plan view partly in section with the device adjusted as shown in Fig. 1; Fig. 3, an end view showing the parts adjusted so as to serve as a couch; Fig. 4, a section on the line 4—4 of Fig. 2; Fig. 5, a section on the line 5—5 of Fig. 2; Fig. 6, a view similar to Fig. 5 with the parts completely folded; Fig. 7, a detail perspective view of one of the angle members, and Fig. 8, a detail perspective view of one of the rockers employed when the device is used as a cradle.

Referring to the drawings the invention is shown as comprising end members A and B each of which includes leg elements 10 and 11 connected together by adjustable braces 12. Secured to each of the leg elements 10 and 11 are angle members C including vertical flanges 13 and 14 the flanges 14 being directly connected to the leg elements 10 and 11 respectively. The flanges 13 of said angle members are provided respectively with vertical slots 15 for a purpose that will presently appear. The flanges 13 of the angle members C which are connected to the leg elements 10 have secured thereto the terminals of bars 16 and 17, while the flanges 13 of the angle members mounted on the legs 11 have connected thereto the termnials of bars 18 and 19. Secured to the leg elements 10 just above the angle members C are transversely extending plates 20 and 21. Pivotally secured to the inner end of the plates 20 and 21 are arms 22 respectively, the free ends of said arms resting upon the upper ends of the angle members C which are secured to the leg elements 11.

Pivotally connected to the outer ends of the plates 20 and 21 are arms 23 respectively and the free ends of these arms 23 are connected by a member 24. Pivotally connected to the arms 23 respectively are braces 25 which extend through the vertical slots 15 in the flange 13 of the angle members carried by the leg elements 10. These braces 25 are provided with notches 26 which are adapted to engage the lower wall of respective slots 15 for the purpose of holding the arms 23 and member 24 in a horizontal plane.

Pivotally connected to the free ends of the arms 22 respectively are arms 27 and the free ends of the latter are connected by a member 28. These arms 27 have pivoted thereto respectively notched members 29 movable through the slots 15 of the angle members carried by the legs 11 and adapted to engage the lower walls of said slots to support the arms 27 and the member 28 in a horizontal plane. The arms 22, 23, 27 and the members 24 and 28 constitute the intermediate and terminal sections of the article of furniture and are all connected by an interlaced wire spring fabric 30. Depending from the arms 22 is a frame 31 which supports spiral springs 32 and upon which latter the interlaced wire spring 30 is adapted to bear. The upper ends of the leg elements 10 and 11 are connected together by members 33 and mounted in each of these members adjacent their ends are screws 34. When the arms 27 are moved to vertical position certain of the screws 34 are operated to engage in the ends of the member 28 and thus positively lock the arms 27 in vertical position. Likewise when the arms 23 are moved into vertical position certain of the screws 34 are operated to engage in the ends of the member 24 and thus secure said arms 23 against movement. The lower ends of the leg elements 10 and 11 are adapted to be detachably engaged in rockers 35 so that when the terminal sections of the article of furniture are disposed in a vertical plane the device will serve the purpose of a cradle. Again when one terminal section is disposed vertically and locked through the medium of the screws 34 and the other terminal section is allowed to move downwardly at its free end to its full extent the device will serve the purpose of a couch.

If all of the sections of the device are disposed horizontally it will be apparent that same can be utilized as a bed the rockers 35 having been previously disconnected from the leg elements.

What we claim is:—

In a folding article of furniture, a rigid frame, plates secured to the respective ends of the rigid frame, arms secured to said plates and having their free ends supported by the rigid frame, frames pivotally connected to said plates and to the free ends of said arms respectively, an interlaced wire spring supported by the arms and by said pivoted frames, and means for securing the pivoted frames in either horizontal or vertical positions.

In testimony whereof, we affix our signatures, in the presence of two witnesses.

CLYDE DUROSSETTE.
JOHN G. WILLIAMS.

Witnesses:
 D. B. SUMMERS,
 H. H. CARDWELL.